ered on the iron and including a compound capable of depositing metallic copper on the iron by the action of heat will accomplish the result I have described.

UNITED STATES PATENT OFFICE.

FRIEDRICH PICH, OF BERLIN, GERMANY.

SOLDERING COMPOUND.

SPECIFICATION forming part of Letters Patent No. 647,632, dated April 17, 1900.

Original application filed March 21, 1898, Serial No. 674,697. Divided and this application filed August 11, 1899. Serial No. 726,915. (No specimens.)

*To all whom it may concern:*

Be it known that I, FRIEDRICH PICH, a subject of the Emperor of Germany, and a resident of Berlin, Germany, have invented certain new and useful Improvements in Soldering Compounds, (for which I have filed applications as follows: in Austria February 23, 1898; in Hungary February 26, 1898; in Belgium February 28, 1898; in France February 23, 1898; in Great Britain February 23, 1898; in Denmark February 23, 1898; in Norway February 26, 1898; in Sweden March 4, 1898; in Italy March 6, 1898; in Luxemburg February 22, 1898; in Spain March 17, 1898; in Russia April 9, 1898, and in Germany December 6, 1897,) of which the following is a specification.

The object of my invention is to provide a new and improved soldering compound, by the use of which compound, in connection with a suitable solder, cast-iron and other substances which have heretofore only with difficulty been hard-soldered together may be quickly, easily, and cheaply brazed or hard-soldered together as completely and solidly as copper, brass, and like metals having a greater affinity for solder than iron may be by the ordinary methods of brazing or hard-soldering.

To form my improved soldering compound, I boil together finely-pulverized borax and finely-pulverized suboxid of copper, so that the same are intimately mixed and so that each particle of the suboxid of copper is surrounded, covered, and protected from the atmosphere by a thin film of the borax. Any desired proportions of the two may be used; but usually I take one-half of each, mixed with sufficient water to dissolve the same thoroughly by the boiling and to cool down into a sort of paste.

While I prefer to use the suboxid of copper, any other suitable form of finely-pulverized copper or the oxid or other form of any metal having a greater affinity for solder than iron may, if desired, be used, and in like manner in place of the borax other suitable fluxes, such as glass or water-glass, may be used; but I have found the best results to arise from the use of suboxid of copper and borax mixed into a paste by boiling the same together in water, although they may be mixed together cold and sometimes even in the form of a dry triturated powder.

To use this soldering compound, the cast-iron surfaces to be soldered are cleaned by means of an acid in the usual way, fixed together, and the joints covered or surrounded with the compound. The joint is then heated, and therefore the borax melts and protects the cleaned surface of the iron against oxidization, removes any oxid thereon, and also protects the suboxid of copper against the action of the oxygen of the atmosphere. Consequently the suboxid of copper, likewise heated to a red heat, transfers its oxygen to the red-hot cast-iron surface, which oxygen combines with the graphite contained in the cast-iron surfaces to form carbon monoxid or dioxid, thus decarbonizing said surfaces, while the metallic copper becomes dissociated in a very finely-divided condition. At the same time the hard-solder is added, and as this solder, which is brought upon the surfaces to be soldered in the well-known manner, is likewise melted by the heat it alloys itself with the incandescent particles of copper, and this new alloy immediately combines with the red-hot decarbonized soldering-surfaces of the cast-iron.

To the paste heretofore described finely-powered decarbonized iron may be added with good results in time and uniformity of union throughout the entire joint, and good results may be also obtained by substituting suboxid of iron alone or mixed with the suboxid of copper for the pure suboxid of copper.

I do not claim herein the process of hard-soldering cast-iron herein described, as I have specifically claimed such process in a separate application for Letters Patent thereon, that and this application being divisional applications of an original application filed by me March 21, 1898, Serial No. 674,697.

I do not intend to limit myself strictly to a soldering compound formed of the exact ingredients herein described, nor to the exact process of forming such compound herein set forth, as I consider that any compound containing any finely-comminuted form of copper which may be deposited on the iron as metallic copper by the action of heat or any compound consisting of a suitable flux forming a film around each particle of any finely-comminuted metal which in its metallic state has a great affinity for solder and may be merged with iron or like metals and deposited thereon in a metallic state is within the scope of my invention.

What I claim is—

1. A soldering compound containing borax and a triturated mixture of finely-comminuted oxid of iron and oxid of copper, substantially as described.

2. A soldering compound containing a metallic oxid or mixture of oxids in a finely-comminuted form, and a suitable fluxing material mingled and mixed therewith in such manner that a film of the fluxing material surrounds and protects from the air each particle of oxid, substantially as described.

3. A soldering compound or paste composed of a mixture of water, borax and finely-comminuted suboxid of copper, substantially as described.

4. As an article of manufacture, a soldering compound, or mixture containing copper in a non-metallic state, and a suitable flux, substantially as described.

5. As an article of manufacture, a soldering compound, or mixture containing suboxid of copper and borax combined, substantially as set forth and for the purposes described.

6. As an article of manufacture, a soldering compound or mixture containing a metal in a non-metallic state capable of being metalized by heat, which metal in the latter state has great affinity for solder, substantially as described.

Signed at Berlin, Germany, this 10th day of July, 1899.

FRIEDRICH PICH.

Witnesses:
HENRY HASPER,
WOLDEMAR HAUPT.